United States Patent [19]

Mizuno et al.

[11] 4,229,998
[45] Oct. 28, 1980

[54] AUTOMATIC SPEED RATIO CONTROL SYSTEM FOR STEPLESS TRANSMISSION OF AUTOMOTIVE VEHICLES

[75] Inventors: Kiyofumi Mizuno, Nagoya; Hiroaki Maeda, Toyota; Shigeo Takahashi, Kariya; Masanori Sato; Satomi Suzuki, both of Nagoya, all of Japan

[73] Assignee: Aisin Seiki Kabushiki Kaisha, Kariya, Japan

[21] Appl. No.: 917,034

[22] Filed: Jun. 19, 1978

[30] Foreign Application Priority Data

Jun. 22, 1977 [JP] Japan .................. 52-74137

[51] Int. Cl.² .................. B60K 41/12; B60K 41/16
[52] U.S. Cl. .................. 74/865; 74/DIG. 1; 74/866
[58] Field of Search .................. 74/865, 855, 856, 866, 74/867, 871, 877, DIG. 1

[56] References Cited

U.S. PATENT DOCUMENTS

| 3,831,465 | 8/1974 | Murakami | 74/DIG. 1 |
|---|---|---|---|
| 3,927,528 | 12/1975 | Kolk et al. | 74/865 X |
| 4,005,620 | 2/1977 | Dach et al. | 74/865 |
| 4,061,055 | 12/1977 | Iizuka et al. | 74/866 |
| 4,106,369 | 8/1978 | Taga | 74/865 X |
| 4,111,073 | 9/1978 | Chana | 74/865 |
| 4,131,035 | 12/1978 | Mizuno et al. | 74/866 |
| 4,140,031 | 2/1979 | Sibued et al. | 74/866 |
| 4,170,153 | 10/1979 | Mizuno | 74/865 |

FOREIGN PATENT DOCUMENTS

| 2250440 | 4/1974 | Fed. Rep. of Germany | 74/865 |
|---|---|---|---|
| 2644128 | 4/1978 | Fed. Rep. of Germany | 74/685 |

Primary Examiner—James T. McCall
Attorney, Agent, or Firm—Sughrue, Rothwell, Mion, Zinn & Macpeak

[57] ABSTRACT

An automatic speed ratio control system of integration servo mechanism type for a stepless transmission of an automotive vehicle. Speed ratio is controlled by a hydraulic pump motor of variable displacement type, which in turn is controlled by an actuator having a piston and a cylinder to which hydraulic oil is supplied. The system comprises a desired value signal generator which produces a desired value signal for an engine speed corresponding to a throttle opening or an output torque of an engine or which produces a desired value signal for an engine output torque corresponding to a throttle opening or an engine speed, a detector for producing a signal indicative of an engine speed or an output torque of an engine, a control signal generator for comparing the signal from the detector against the signal from the target desired value signal generator to produce a control signal in accordance with a deviation therebetween, and a controller responsive to the control signal to drive the actuator to change a speed ratio of the stepless transmission. The system is characterized by further comprising means for producing a signal indicative of the differential or pseudo-differential of a throttle opening during the time the throttle opening increases, a signal from said means being added algebraically in opposing relationship with the signal from the desired value signal generator in the control signal generator or in opposing relationship with the signal from the control signal generator in the controller to prevent an abnormal rise in rotational speed of an engine of the vehicle during a rapid starting.

3 Claims, 8 Drawing Figures

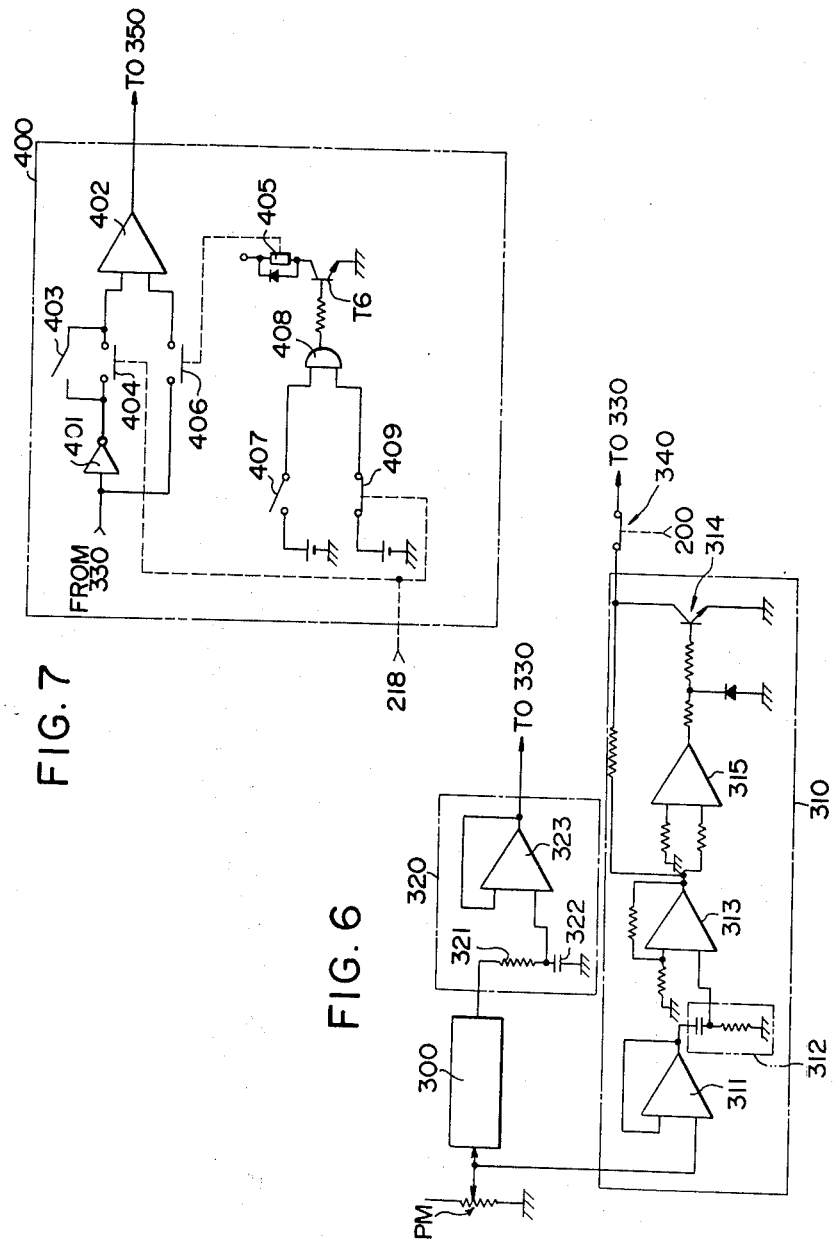

AUTOMATIC SPEED RATIO CONTROL SYSTEM FOR STEPLESS TRANSMISSION OF AUTOMOTIVE VEHICLES

BACKGROUND OF THE INVENTION

The invention relates to an automatic speed ratio control system which controls the speed ratio of an stepless transmission of an automotive vehicle so that a given engine condition is achieved.

The output torque $T_E$ of an engine is related to the torque which is dissipated by the running of the vehicle as the following equation, assuming no torque loss:

$$T_E = (J \cdot \dot{n}_2 + A \cdot n_2^2 + B) \times e \quad (1)$$

where "e" represents a speed ratio, "$n_2$" represents the rotational speed of an output shaft, $\dot{n}_2$ represents $dn_2/dt$, "J" represents the output inertia, "A" represents windage loss and "B" represents grade resistance. Since the speed ratio "e" presents the ratio of the rotational speed "$n_2$" of the output shaft to that "$n_1$" of the input shaft, we have $$n_2 = e \cdot n_1 \quad (2)$$

Substituting the equation (2) into the equation (1) and solving for the rate of change "ė" of speed ratio, we have $$\dot{e} = \frac{T_E - J \cdot \dot{n}_1 \cdot e^2}{J \cdot n_1 \cdot e} - \frac{1}{J}\left(A \cdot e^2 \cdot n_1 + \frac{B}{n_1}\right) \quad (3)$$

Ideally an automatic speed ratio control system should provide the rate "ė" represented by the equation (3) as an output for controlling the speed ratio. While this may appear to be practicable, it is impossible in practice to achieve such an arrangement.

A conventional arrangement has been an automatic speed ratio control system of an integrating servo type which comprises a desired value signal generator which produces a signal indicative of a desired value of the rotational speed of an engine which corresponds to the magnitude of an engine throttle opening or an engine output torque or which produces a signal indicative of a desired value of the engine output torque which corresponds to the rotational speed of the engine, a detector providing a signal indicative of either the rotational speed or the output torque of the engine, a control signal generator for producing a control signal in accordance with a deviation of the detector signal from the desired value signal, and a controller responsive to the control signal to change the speed ratio of a stepless transmission.

In such an arrangement, the rate "ė" is represented by either equation (4) or equation (5).

$$\dot{e} = K_1(n_o - n_E) \quad (4)$$

where "$K_1$" represents a constant, "$n_o$" a desired value of the rotational speed of the engine and "$n_E$" the rotational speed of the engine.

$$\dot{e} = K_2(T_o - T_E) \quad (5)$$

where "$K_2$" represents a constant, "$T_o$" a desired value for the output torque of the engine and "$T_E$" the output torque of the engine.

When an arrangement is made producing the rate "ė" as represented by the equation (4) and in which the value of the constant "$K_1$" is chosen to satisfy a normal running it is found that an abnormal rise in the rotational speed of the engine occurs during a rapid starting. A study of such situation revealed that this is due to the fact that the rate "ė" is not in substantial inverse proportion to the speed ratio "e" when the equation (3) dictates that it should be under a condition where the magnitude of the speed ratio "e" is small, and also due to an increase in the rotational speed of the engine which occurs prior to an increase in the output torque of the engine during the starting phase and to a lag involved with the controller. These factors are also present when the rate "ė" is represented by the equation (5).

Therefore, it will be seen that the elimination or alleviation of the described difficulty requires that an increase in the speed ratio occurs in immediate response to an increase in the throttle opening and that the rate "ė" be substantially inversely proportional to the speed ratio "e".

SUMMARY OF THE INVENTION

The invention has for its object the provision of an arrangement which achieves objectives mentioned in the immediately preceding paragraph.

The invention is based on the finding that the speed ratio "e" increases with time during the starting phase. According to the invention, means producing a signal indicative a derivative or pseudo-derivative of the throttle opening during the increase of the throttle opening for counteracting a signal from the desired value signal generator in the control signal generator or counteracting a signal from the control signal generator in the controller during the starting phase is provided.

BRIEF DESCRIPTION OF THE DRAWINGS

FIG. 6 is a circuit diagram of a primary lag circuit and a compensation circuit shown in FIG. 4;

FIG. 7 is a circuit diagram of a polarity reversal circuit shown in FIG. 4; and

DESCRIPTION OF PREFERRED EMBODIMENTS

Figure 1:
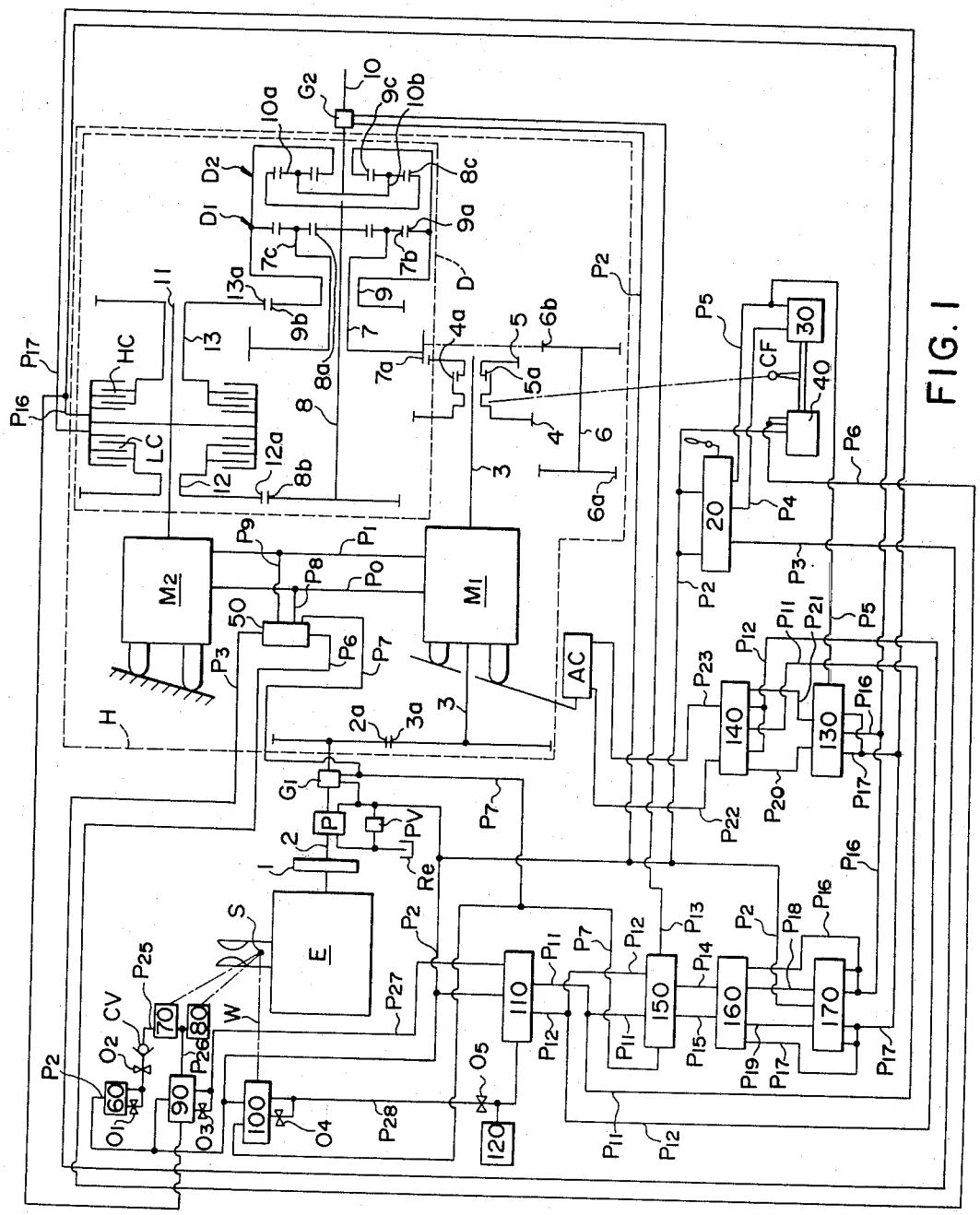
FIG. 1 is a schematic diagram illustrating the general arrangement of one embodiment of the invention.

Referring to FIG. 1, an engine E is connected through a flywheel 1 to an input shaft 2 of a hydro-mechanical transmission H. Connected with the input shaft 2 is a hydraulic pump P which cooperates with a relief valve PV to supply a given line pressure to an oil path $P_2$. Also connected with the input shaft 2 is a governor valve $G_1$ which adjusts the line pressure to a value which depends on the rotational speed of the engine E for supply to an oil path $P_7$. A gear 2a is fixedly mounted on the right-hand end of the input shaft 2, and meshes with a gear 3a fixedly mounted on the rotary shaft 3 of a first hydraulic pump motor $M_1$ of variable displacement type. A gear 4 is splined to the shaft 3 so as to be slidabe axially and carries on its right-hand end a dog gear 4a, which can be driven in the lateral direction by a forward reverse shifting fork CF. In its right-hand position, the dog gear 4a can mesh with a dog gear 5a on a gear 5 which is rotatably mounted on the shaft 3. In its right-hand end position, it meshes with a left-hand gear 6a on a reverse shaft 6. The gear 5 and a right-hand gear 6b on the reverse shaft 6 are maintained in meshing engagement with a gear 7a on an intermediate shaft 7 which forms part of a differential gearing D. The differential gearing D includes a first epicyclic gearing $D_1$ and a second epicyclic gearing $D_2$. The first epicyclic gearing $D_1$ includes a sun gear 8a which is fixedly mounted on a first reaction shaft 8, on the left-hand end of which is fixedly mounted a gear 8b which meshes with an output gear 12a of a low range clutch LC. A ring gear 8c of the second epicyclic gearing $D_2$ is fixedly mounted on the right-hand end of the first reaction shaft 8. The first epicyclic gearing $D_1$ also includes a ring gear 9a which is fixedly mounted on a second reaction shaft 9 which is in turn rotatably mounted on the intermediate shaft 7. A gear 9b is fixedly mounted on the left-hand end of the second reaction shaft 9 and meshes with an output gear 13a of a high range clutch HC. A sun gear 9c of the second epicyclic gearing $D_2$ is fixedly mounted on the right-hand end of the second reaction shaft 9. The first epicyclic gearing $D_1$ also includes a planet gear 7b rotatably mounted on a carrier 7c which is located on the right-hand end of the intermediate shaft 7 which is in turn rotatably mounted on the first reaction shaft 8. The second epicyclic gearing $D_2$ includes a planet gear 10a which is rotatably mounted on a carrier 10b located on the left-hand end of an output shaft 10. A second hydraulic pump motor $M_2$ of a fixed displacement type is connected with the first pump motor $M_1$ through oil paths $P_0$ $P_1$ and includes a rotary shaft 11 on which the low range and the high range clutch LC, HC are mounted. The low range clutch LC has an output shaft 12 which is rotatably mounted on the rotary shaft 11 and which rotates integrally therewith in response to the line pressure of an oil path $P_{17}$. Similarly, the high range clutch HC has an output shaft 13 which is rotatably mounted on the rotary shaft 11 and which rotates integrally therewith in response to the line pressure of an oil path $P_{16}$.

Figure 3:
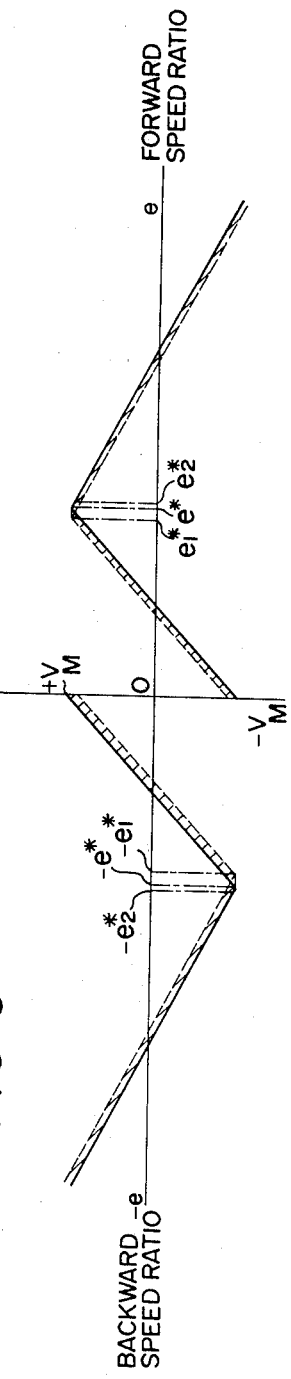
FIG. 3 graphically shows the relationship between the speed ratio of hydro-mechanical transmission and the discharge volume of a first hydraulic pump motor.

With the hydro-mechanical transmission H, when the dog gears 4a, 5a are brought into meshing engagement with each other and either low range or high range clutch LC or HC is actuated, the output shaft 10 can be rotated in the same direction as the input shaft 2. Conversely, when the gears 4, 6a are brought into meshing engagement with each other, the actuation of either clutch LC or HC rotates the output shaft 10 in the opposite direction from the input shaft 2. The meshing engagement between the dog gears 4a, 5a combined with the actuation of the low range clutch LC represents a status of transmission in the low speed ratio region in the forward direction while the meshing engagement between the dog gears 4a, 5a combined with the actuation of the high range clutch HC represents a status of transmission in the high speed ratio region in the forward direction. Conversely, the meshing engagement between the gears 4 and 6a achieves a status of a transmission in the low speed ratio region when the low range clutch LC is actuated, and in the high speed ratio region when the high range clutch HC is actuated, both in the reverse direction. The relationship between the discharge volume V of the first hydraulic pump motor $M_1$ and the forward speed ratio "e" or reverse speed ratio "−e" is illustrated in FIG. 3 by a shaded band, considering the oil leakage within the motors $M_1$, $M_2$. The solid line in FIG. 3 represents the relationship which results when the oil leakage is null. By contrast, the broken lines correspond to a maximum oil leakage.

A control system for the hydro-mechanical transmission H will now be described. A manual shift valve 20 shown in the lower right-hand portion of FIG. 1 controls a communication between oil paths $P_3$, $P_4$, $P_5$ on one hand and oil path $P_2$ and reservoir Re on the other, and has three positions, namely a neutral, a forward and a reverse position. In its forward position, valve 20 disconnects path $P_3$ from reservoir Re and connects it with path $P_2$, and also disconnects both paths $P_4$, $P_5$ from either path $P_2$ or reservoir Re. In the forward position, the valve disconnects path $P_3$ from path $P_2$ and connect the former with reservoir Re, and connects paths $P_4$ and $P_5$ with path $P_2$ and reservoir Re, respectively. In the reverse position, the valve disconnects path $P_3$ from path $P_2$ and connects the former with reservoir Re, and also connects paths $P_4$ and $P_5$ with reservoir Re and path $P_2$, respectively.

An actuator 30 is connected with paths $P_4$ and $P_5$ for shifting the forward/reverse shifting fork CF in the lateral direction. When the valve 20 shifts to its forward position to supply the line pressure to path $P_4$, the actuator 30 responds thereto by moving the gear 4 to its right-hand end position through the fork CF, thus bringing the dog gear 4a into meshing engagement with dog gear 5a. When the valve 20 shifts to the reverse position to supply the line pressure to path $P_5$, the actuator 30 brings the gear 4 to its left-hand end position through fork CF, thus causing it to mesh with gear 6a. A valve 40 mounted on the left-hand end of fork CF provides a temporary communication between paths $P_6$ and $P_2$ during the stroke of the gear 4 between its end positions.

A bypass clutch valve 50 is connected with paths $P_3$, $P_6$ and $P_7$ for enabling or disabling a communication between path $P_8$ connected with path $P_0$ and path $P_9$ connected with path $P_1$. In the neutral position of the valve 20 when the line pressure is supplied to path $P_3$, a communication is established between paths $P_8$ and $P_9$ to establish a neutral condition of the transmission H. A communication between paths $P_8$ and $P_9$ is also established during the idling of the engine E and when the line pressure is not supplied to path $P_6$. However, when the line pressure is supplied to path $P_6$, the communication between paths $P_8$ and $P_9$ is interrupted. The communication between these paths is also interrupted when no line pressure is supplied to path $P_3$ and the rotational speed of the engine E is higher than the idling speed.

The detailed construction of manual shift valve 20, actuator 30, valve 40 and bypass clutch valve 50 is described in Japanese Patent Application No. 10,127/1976.

A hydraulic pressure which approximates the differential of the throttle opening is supplied to path $P_{27}$ during a rapid starting by the combination of a regulator valve 60, a dash pot 70, a variable throttle valve 80 and a modulator valve 90 shown in the upper left-hand portion of FIG. 1, and the detail of which will be described below with reference to FIG. 2.

Figure 2:
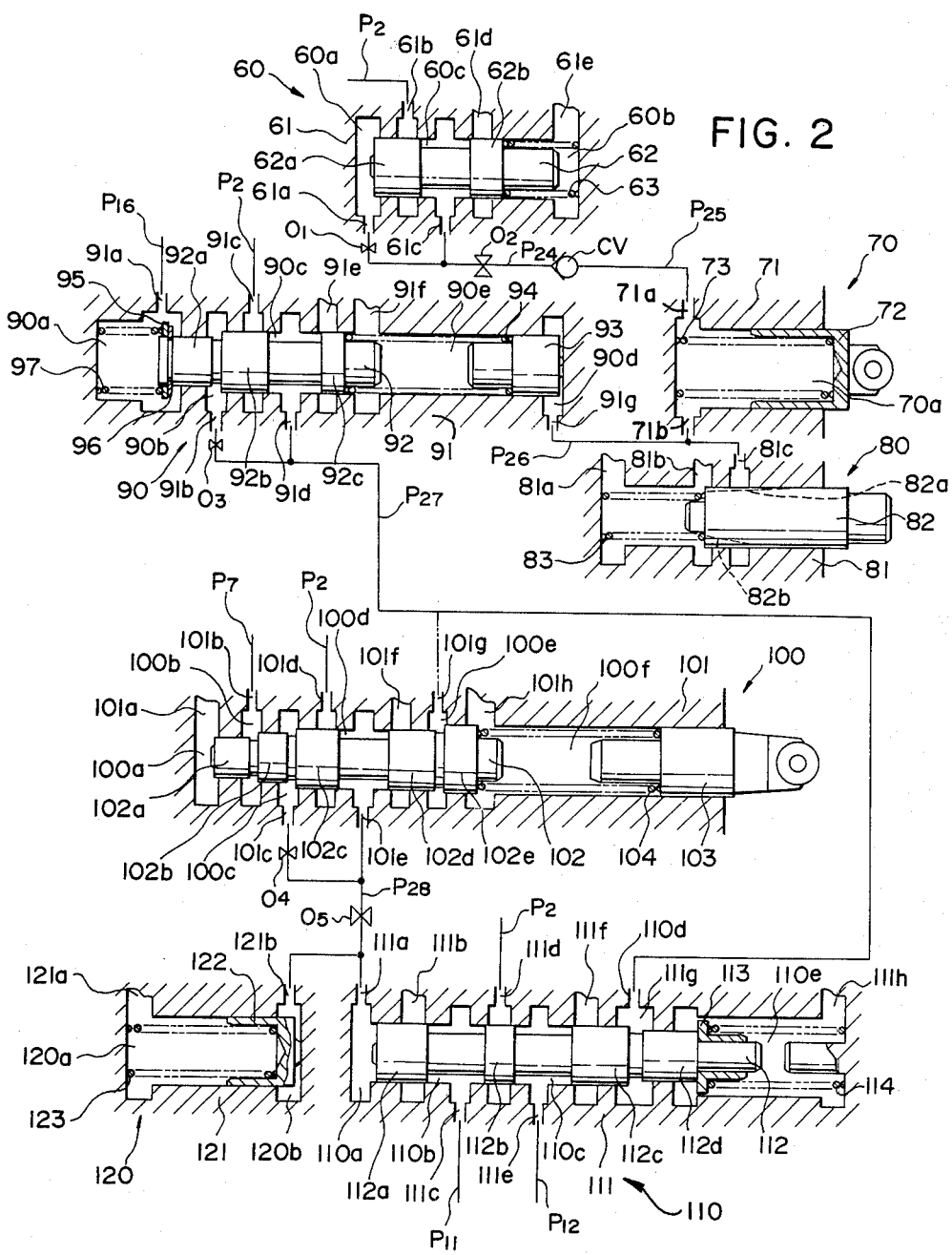
FIG. 2 is a schematic view showing the detail of certain parts shown in FIG. 1.

Regulator valve 60 shown in the upper portion of FIG. 2 adjusts the line pressure in path $P_2$ to a lower preset pressure, which is supplied to path $P_{24}$. It includes a body 61, a spool 62 slidably fitted in the body, and a spring 63. Body 61 has five ports 61a to 61e. Second port 61b communicates with path $P_2$, fourth port 61d and fifth port 61e communicate with reservoir Re, third port 61c communicates with path $P_{24}$ and first port 61a communicates with path $P_{24}$ through a fixed orifice $O_1$. Spool 62 has a pair of lands 62a, 62b of an equal diameter, which cooperate with the body to define an oil chamber 60a communicating with first port 61a, an oil chamber 60b communicating with fifth port 61e and an annular oil chamber 60c communicating with third port 61c. Spool 62 is urged to the left by the spring 63 and is urged to the right by the hydraulic pressure applied from path $P_{24}$ to the oil chamber 60a through the fixed orifice $O_1$. As a consequence, the spool assumes a position in which the annular chamber 60c is disconnected from both second and fourth ports 61b, 61d when a hydraulic pressure of a given magnitude is present in path $P_{24}$, assumes another position in which the annular chamber 60c communicates with second port 61b when the hydraulic pressure of path $P_{24}$ is lower than the given magnitude, and assumes a further position in which the annular chamber 60c communicates with fourth port 61d when the hydraulic pressure of path $P_{24}$ is higher than the given magnitude Dash pot 70 comprises a body 71, a plunger 70a which slidably fits in the body, and a return spring 73 which urges the plunger to the right. The body 71 is formed with an inlet port 71a and an outlet port 71b. Inlet port 71a communicates with path $P_{25}$ while outlet port 71b communicates with path $P_{26}$. Path $P_{25}$ is connected with path $P_{24}$ through a check valve CV which is provided with a fixed orifice $O_2$ therein for maintaining a small flow to path $P_{25}$. The plunger 72 defines an oil chamber 70a within the body which communicates with both ports 71a, 71b. At its right-hand end, the plunger projects out of the body for engagement with a cam, not shown, which is connected with an engine throttle S, so that it is capable of sliding to the left or right in accordance with the throttle opening of the engine.

The variable throttle valve 80 comprises a body 81, a spool 82 slidably fitted in the body, and a spring 83 which urges the spool to the right. The body 81 is formed with three ports 81a, 81b and 81c. First port 81a and second 81b communicate with the reservoir Re while third port 81c communicates with path $P_{26}$. In its outer periphery, the spool 82 is formed with axially extending grooves 82a, 82b which provide a communication between second and third ports 81b, 81c. It is to be noted that the depth of these grooves varies in the axial direction. At its right-hand end, the spool 82 projects out of the body for engagement with a cam, not shown, connected with the engine throttle so as to be moved to the right or left in accordance with the throttle opening of the engine.

The modulator valve 90 includes a body 91 which is formed with seven ports 91a to 91g. First port 91a communicates with oil path $P_{16}$ which supplies the line pressure to the high range clutch HC; third port 91c communicates with path $P_2$; and fifth and sixth ports 91e, 91f communicate with the reservoir Re. Seventh port 91g communicates with oil path $P_{26}$; fourth port 91d communicates with oil path $P_{27}$; and second port 91b communicates with oil path $P_{27}$ through an orifice $O_3$. A spool 92 slidably fits in the body 91, and is formed with a land 92a of a small diameter and a pair of lands 92b, 92c of a larger diameter. These lands cooperate with the body to define an oil chamber 90a communicating with first port 91a, an annular oil chamber 90b communicating with second port 91b, and an annular passage 90c communicating with fourth port 91d. A piston 93 slidably fits in the right-hand portion of the body 91, and cooperates therewith to define an oil chamber 90d which communicates with seventh port 91g. An oil chamber 90e defined between the spool 92 and the piston 93 communicates with sixth port 91f. A compression spring 94 is interposed between spool 92 and piston 93, thus urging spool 92 to the left and urging piston 93 to the right. A spring abutment 95 is mounted around the left-hand end of the spool 92 by means of a snap ring 96, and a spring 97 is interposed between the spring abutment and the body, thus urging spool 92 to the right. When spool 92 assumes a position in which the annular passage 90c is disconnected from both third and fifth ports 91c, 91e and the piston 93 assumes its right-hand end position in which it abuts against the body, the resilience of spring 97 exceeds that of spring 94, and the spring constant of spring 97 is chosen substantially less than that of spring 94.

In the described arrangement, when the throttle opening increases, the plunger 72 of the dash pot 70 and the spool 82 of the variable throttle valve 80 slide to the left, the arrangement being such that the flow discharged by the dash pot 70 from oil chamber 70a to paths $P_{25}$, $P_{26}$ coincides with the flow released from the variable throttle valve 80 to the reservoir Re through path $P_{26}$ when the throttle opening increases at a given rate of change.

When starting, if the rate of change of the throttle opening increases above the given value, namely, during a rapid starting, the flow discharged by the dash pot 70 exceeds the flow released from the throttle valve 80 and hence there occurs a high hydraulic pressure, which approximates the differential of the throttle opening, in oil path $P_{25}$, oil chamber 70a of the dash pot 70, path $P_{26}$ and the oil chamber 90d of the modulator valve 90 as the throttle opening increases. The hydraulic pressure increases until the piston 93 of the modulator valve 90 moves to the left from its right-hand end position to balance the resilience of spring 94 against the hydraulic pressure prevailing in the oil chamber 90d. In this manner, the spool 92 slides in accordance with the relative magnitude of the resilience of spring 94, the resilience of its opposing spring 97 and the hydraulic pressure in the oil chamber 90d, thus supplying a hydraulic pressure corresponding to that of the oil chamber 90d to path $P_{27}$ from path $P_2$. When the throttle opening ceases to increase, the hydraulic oil in the oil chamber 90d is released by the variable throttle valve 80 into the reservoir Re, whereby the hydraulic pressure prevailing in the oil chamber 90d decreases with time. This causes the piston 93 to slide toward its right-hand end position, thus reducing the resilience of spring 94, whereby the hydraulic pressure of path $P_{27}$ decreases with a decrease in the hydraulic pressure of the oil chamber 90d.

By contrast, when the line pressure is supplied to oil path $P_{16}$, or when the high range clutch HC of the transmission H is operative and the vehicle is running at a relatively high speed, the line pressure supplied to the oil chamber 90a through path $P_{16}$ maintains the spool 92 in a position in which the annular passage 90c is in communication with fifth port 91e, so that no hydraulic pressure is supplied to path $P_{27}$ if the throttle opening increases above a given rate to cause a pressure rise in the oil chamber 90d.

During the starting, if the throttle opening is increased below the given rate of change, the discharge flow from the dash pot 70 will be less than the flow released from the variable throttle valve 8, and hence there occurs no pressure rise in oil path $P_{25}$, oil chamber 70a, oil path $P_{26}$ and oil chamber 90d. As a consequence, the piston 93 is maintained in it right-hand end position by spring 94 while the spool 92 is maintained, by spring 97, in a position in which the annular passage 90c communicates with fifth port 91e, thus supplying no hydraulic pressure to oil path $P_{27}$.

During a rapid starting, if the throttle opening is increased and then returned to its original value, the pressure in oil path $P_{25}$, oil chamber 70a, oil path $P_{26}$ and oil chamber 90d will increase momentarily, but collapses at the same time the throttle opening is returned. The hydraulic pressure in oil path $P_{27}$ follows such change in the hydraulic pressure.

It will be noted that when there is no hydraulic pressure in oil path $P_{25}$, oil chamber 70a, oil path $P_{26}$ and oil chamber 90d, a small constant flow is supplied from oil path $P_{24}$ to oil path $P_{25}$, so that oil path $P_{25}$, oil chamber 70a, oil path $P_{26}$ and oil chamber 90d are always filled with an oil.

A speed ratio adjusting valve 100 adjusts the line pressure from oil path $P_2$ to a predetermined value and supplies it to oil path $P_{28}$ if the rotational speed of the engine is in coincidence with a desired value of such speed which corresponds to the throttle opening. However, it adjusts the line pressure from oil path $P_2$ to a value which is higher than the predetermined value by an amount corresponding to a difference between the rotational speed of the engine and its desired value and supplies such increased pressure to oil path $P_{28}$ if the rotational speed of the engine is less than the desired value while it adjusts the line pressure from oil path $P_2$ to a value which is lower than the predetermined value by an amount corresponding to a difference between the rotational speed of the engine and its desired value and supplies such reduced pressure to oil path $P_{28}$ if the rotational speed of the engine is higher than its target value. The valve 100 includes a body 101, a spool 102 slidably fitted in the left-hand portion of the body, a piston 103 slidably fitted in the right-hand portion of the body 101, and a coiled compression spring 104 interposed between the spool 102 and piston 103. The body 101 is formed with eight ports 101a and 101h. First port 101a and sixth to eighth ports 101f to 101h communicate with the resevoir Re; fourth port 101d communicates with oil path $P_2$; second port 101b communicates with oil path $P_7$; third port 101c communicates with oil path $P_{28}$ through an orifice $O_4$; and fifth port 101e communicates with oil path $P_{28}$. The spool 102 is formed with five lands 102a to 102e. Land 102b has a greater diameter than land 102a. Lands 102c and 102d have an equal diameter which is greater than the diameter of land 102b. Land 102e has a greater diameter than lands 102c and 102d. The spool 102 cooperates with the body to define an oil chamber 100a communicating with first port 101a, an annular oil chamber 100b communicating with second port 101b, an annular oil chamber 100c communicating with third port 101b, an annular passage 100d communicating with fifth port 101e, and an annular oil chamber 100e communicating with seventh port 101g. An oil chamber 100f is defined between the spool 102 and the piston 103, and communicates with eighth port 101h. At its right-hand end, the piston 103 projects out of the body for abutment against a cam, not shown, which assumes an angular position corresponding to the throttle opening, by being interlocked with the engine throttle S. As a consequence, the piston 103 assumes a position within the body 101 which corresponds to the throttle opening, and adjusts the resilience of spring 104 at a position of the spool 102 in which the annular passage 100d is disconnected from both fourth and sixth ports 101d and 10f to be equal to the sum of the product of a difference in the cross-sectional area of the lands 102c, 102b with the predetermined pressure value of oil path $P_{28}$ and the product of a difference in the cross-sectional area of the lands 102b, 102a with the hydraulic pressure supplied from oil path $P_7$ to the annular oil chamber 100b when the engine speed coincides with its desired value. A desired engine speed value corresponding to a minimum throttle opening is established at a level which is properly above the idling speed of the engine. The desired value of the engine speed increases with an increase in the throttle opening.

A speed ratio adjusting oil control valve 110 is effective to control the degree of communication between a speed ratio down oil path $P_{11}$ on one hand and oil path $P_2$ and reservoir Re on the other and also the degree of communication between a speed ratio up oil path $P_{12}$ on one hand and oil path $P_2$ and reservoir Re on the other in accordance with the hydraulic pressures supplied from oil paths $P_{27}$ and $P_{28}$. It comprises a body 111, a spool 112 slidably fitted in the body, and a spring 114 which urges the spool 112 to the left through a retainer 113. The body 111 is formed with eight ports 111a to 111h. First port 111a communicates with oil path $P_{28}$ through an orifice $O_5$; second port 111b, sixth port 111f and eighth port 111h communicate with reservoir Re; third port 111c communicates with the speed ratio down oil path $P_{11}$; fourth port 111d communicates with oil path $P_2$; fifth port 111e communicates with the speed ratio up oil path $P_{12}$; and seventh port 111g communicates with oil path $P_{27}$. The spool 112 is formed with four lands 112a to 112d, which cooperate with the body 111 to define an oil chamber 110a communicating with first port 111a, an annular passage 110b communicating with third port 111c, an annular passage 110c communicating with fifth port 111e, an annular oil chamber 110d communicating with seventh port 111g, and an oil chamber 110e communicating with eighth port 111h. The lands 112a to 112c are of an equal diameter while land 112d is of a reduced diameter. The resilience of spring 114 at a position of the spool 112 in which the annular passage 110b is disconnected from both second and fourth ports 111b and 111d and in which the annular passage 110c is disconnected from both fourth and sixth port 111d and 111f is chosen to be equal to the product of the predetermined pressure of oil path $P_{28}$ multiplied by the cross-sectional area of the land 112a.

An accumulator 120 cooperates with an orifice $O_5$ to delay the application of the hydraulic pressure prevailing in oil path $P_{28}$ to the oil chamber 110a of the oil control valve 110, and also enables a rapid sliding movement of the spool 112 to the left in response to the application of the hydraulic pressure from oil path $P_{27}$. The accumulator comprises a body 121, a piston 122 slidably fitted in the body, and a spring 123 which urges the piston to the right. A chamber 120a located on the left-hand side of piston 122 communicates with the reservoir Re through port 121 while a right-hand chamber 120b communicates with port 111a of the oil control valve 110 through a port 121b and an oil path.

Returning to FIG. 1, a pair of selector valves 130 and 140 control the communication between a pair of oil paths $P_{22}$, $P_{23}$, connected with an actuator AC which is in turn connected with a swash plate associated with the first hydraulic pump motor $M_1$ on one hand and the speed ratio down and up oil paths $P_{11}$ and $P_{12}$ on the other in accordance with the condition of the hydro-mechanical transmission H. The selector valve 130 controls the communication between oil paths $P_{20}$, $P_{21}$ on one hand and oil paths $P_{16}$, $P_{17}$ on the other in accordance with the presence or absence of the line pressure in oil path $P_5$. In the absence of the line pressure in oil path $P_5$, it provides a communication between oil paths $P_{20}$, $P_{21}$ and oil paths $P_{16}$, $P_{17}$, respectively. In the presence of the line pressure in oil path $P_5$ (reverse operation), it provides a communication between oil paths $P_{20}$, $P_{21}$ and oil paths $P_{17}$, $P_{16}$, respectively. The selector valve 140 controls the communication between oil paths $P_{22}$, $P_{23}$ and the speed ratio down and up oil paths $P_{11}$, $P_{12}$ in accordance with the line pressure in oil paths $P_{20}$, $P_{21}$. When the line pressure is supplied to oil path $P_{20}$, it provides a communication between oil paths $P_{22}$, $P_{23}$ and speed ratio down and up oil paths $P_{11}$, $P_{12}$, respectively. Conversely, when the line pressure is supplied to oil path $P_{21}$, it provides a communication between oil paths $P_{22}$, $P_{23}$ and speed ratio up and down oil paths $P_{12}$, $P_{11}$, respectively. The actuator AC causes the discharge volume of the first hydraulic pump motor $M_1$ to vary toward $+V_M$ shown in FIG. 3 in response to the hydraulic oil supplied through oil path $P_{22}$, and causes the discharge volume of the first hydraulic pump motor $M_1$ to vary toward $-V_M$ shown in FIG. 3 in response to the hydraulic oil supplied through oil path $P_{23}$.

The provision of the selector valves 130, 140 in this manner achieves a communication between the speed ratio down path $P_{11}$ and the speed ratio up path $P_{12}$ on one hand and oil paths $P_{23}$ and $P_{22}$ on the other, respectively, in the transmission status of the hydro-mechanical transmission H, in the forward, low speed ratio mode and in the reverse, high speed ratio mode. Then, the oil control valve 110 provides a communication between the speed ratio down path $P_{11}$ and oil path $P_2$ and provides a communication between the speed ratio up path $P_{12}$ and the reservoir Re. As the actuator AC causes the discharge volume of the first hydraulic pump motor $M_1$ to vary toward $-V_M$ shown in FIG. 3, the speed ratio is lowered. Conversely, when the oil control valve 110 provides a communication between the up path $P_{12}$ and oil path $P_2$ and also a communication between the down path $P_{11}$ and the reservoir Re, the actuator AC causes the discharge volume of the first hydraulic pump motor $M_1$ to vary toward $+V_M$, thereby increasing the speed ratio. In a forward, high speed ratio region mode and a reverse, low speed ratio region mode of the hydro-mechanical transmission H, the down path $P_1$ and the up path $P_{12}$ communicate with oil paths $P_{22}$ and $P_{23}$, respectively, so that the oil control valve 110 provides a communication between the down path $P_{11}$ and oil path $P_2$ and a communication between the up path $P_{12}$ and the reservoir Re. Accordingly, the actuator AC causes the discharge volume of the first hydraulic pump motor $M_1$ to vary toward $+V_M$ shown in FIG. 3, thus reducing the speed ratio. When the oil control valve 110 provides a communication between the up path $P_{12}$ and oil path $P_2$ and a communication between the down path $P_{11}$ and reservoir Re, the actuator AC causes the discharge volume of the first hydraulic pump motor $M_1$ to vary toward $-V_M$ shown in FIG. 3, thus increasing the speed ratio.

When the speed ratio varies in the manner mentioned above, the rate of change of the speed ratio will be determined by the degree of communication provided by the oil control valve 110 between the down and up paths $P_{11}$, $P_{12}$ on one hand and oil path $P_2$ and reservoir Re on the other, the rate increasing with an increasing degree of communication.

A control of the low and high range clutch LC, HC will now be described. A clutch switching and speed ratio detecting valve 150 functions to compare a hydraulic pressure supplied from the governor valve $G_1$ through oil path $P_7$ against a hydraulic pressure supplied through oil path $P_{13}$ from a governor valve $G_2$ which is mounted on the output shaft 10 to detect whether the speed ratio "e" or "−e" assumes a clutch switching speed ratio "e*" defined by a range from "$e_1$*" to $e_2$*", or "−e*" defined by a range from $-e_1$* to $-e_2$*, and to provide a communication between oil paths $P_{14}$ and $P_{15}$ on one hand and the reservoir Re when the speed ratio is below the switching speed ratio and to provide a communication between oil paths $P_{14}$ and $P_{15}$ on one hand and oil paths $P_{12}$ and $P_{11}$, respectively, when the speed ratio exceeds the switching speed ratio. Thus, if the line pressure is applied to the down path $P_{11}$ in order to reduce the speed ratio when the latter reaches the switching level, the line pressure is supplied to oil path $P_{15}$. Similarly, if the line pressure is applied to the up path $P_{12}$ in order to increase the speed ratio, the line pressure is supplied to oil path $P_{14}$.

A selector valve 160 controls a communication between oil paths $P_{14}$ and $P_{18}$ and a communication between oil paths $P_{15}$ and $P_{19}$ in accordance with the application of the line pressure to oil paths $P_{16}$ and $P_{17}$. It provides a communication between oil paths $P_{14}$ and $P_{18}$ and a communication between oil path $P_{19}$ and the reservoir Re when the line pressure is supplied to oil path $P_{17}$ but is not supplied to oil path $P_{16}$. Conversely, when the line pressure is supplied to oil path $P_{16}$ but is not supplied to oil path $P_{17}$, it provides a communication between oil paths $P_{15}$ and $P_{19}$ and a communication between oil path $P_{18}$ and the reservoir Re.

A clutch control valve 170 controls the application of the line pressure to oil paths $P_{16}$, $P_{17}$. When the vehicle is parked and no line pressure is applied to oil path $P_2$, it provides a communication between oil paths $P_{17}$ and $P_2$ and a communication between oil path $P_{16}$ and reservoir Re in preparation to the actuation of the low range clutch LC, by applying the line pressure to oil path $P_{17}$ whenever the engine E is started to supply the line pressure to oil path $P_2$. Whenever the line pressure of oil path $P_2$ is supplied to oil path $P_{17}$, the clutch control valve 170 maintains the application of the line pressure to oil path $P_{17}$ by being supplied with the line pressure from oil path $P_{17}$. If the speed ratio increases to reach a clutch switching level and the line pressure is supplied to the up path $P_{12}$ in order to further increase the speed ratio while the line pressure is supplied to oil path $P_{17}$, the line pressure will be supplied to oil path $P_{18}$ through the clutch switching and speed ratio detecting valve 150 and selector valve 160, whereby the clutch control valve 170 responds to the line pressure supplied through oil path $P_{18}$ by providing a communication between oil paths $P_{16}$ and $P_2$, thereby actuating the high range clutch HC. It also provides a communication between oil path P$_{17}$ and reservoir Re to deactuate the low range clutch LC, and maintains the application of the line pressure to oil path P$_{16}$ by being supplied with the line pressure from oil path P$_{16}$. When the line pressure is supplied to oil path P$_{16}$, if the speed ratio decreases to reach a clutch switching level and the line pressure is supplied to down path P$_{11}$ in order to further decrease the speed ratio, the clutch switching and speed ratio detecting valve 150 and selector valve 160 supply the line pressure to oil path P$_{19}$. The clutch control valve responds to the line pressure supplied through oil path P$_{19}$ by providing a communication between oil paths P$_{17}$ and P$_2$, thus actuating the low range clutch LC. In addition, it provides a communication between oil path P$_{16}$ and reservoir Re to deactuate the high range clutch HC, which is maintained deactuated.

The starting of the engine E takes place after shifting the manual shift valve 20 to its neutral position. As the engine E starts, the hydraulic pump P is activated to supply the line pressure to oil path P$_2$, and the line pressure is thence transmitted to oil path P$_{17}$ through the clutch control valve 170, thus actuating the low range clutch LC of the hdyro-mechanical transmission H. To run the vehicle in the forward direction, the valve 20 is shifted to its forward position to operate the actuator 30, thus bringing the dog gears 4a and 5a of the transmission H into meshing engagement with each other to establish a forward, low speed ratio mode. If it is desired to run the vehicle in the reverse direction, the valve 20 is shifted to its reverse position to operate the actuator 30 so as to achieve a meshing engagement between the gears 4 and 6 of the transmission H to establish a reverse, low speed ratio mode thereof.

In the forward, low speed ratio mode of the transmission H, the throttle opening is not increased unless the accelerator pedal is depressed for purpose of starting, so that the hydraulic pressure in the oil chamber 90d of the modulator valve 90 has a value which is insufficient to move the piston 93 to the left. Consequently, the hydraulic pressure in oil path P$_{27}$ extending from the valve 90 is null. On the other hand, the speed ratio adjusting valve 100 supplies a hydraulic pressure to oil path P$_{28}$ which is higher than the predetermined pressure value as a result of the idling speed reached and due to the fact that the desired value of the engine speed at a minimum throttle opening is established higher than the idling speed of the engine. This hydraulic pressure in oil path P$_{28}$ is maintained for a duration which is sufficient to compensate for a lagging caused by the orifice O$_5$ and accumulator 120. When the oil pressure from oil path P$_{28}$ is supplied to the oil chamber 110a of the oil control valve 110, the spool 112 of the valve 110 permits a communication between speed ratio down path P$_{11}$ and oil path P$_2$ and a communication between speed ratio up path P$_{12}$ and the reservoir Re since the pressure from path P$_{28}$ is higher than the predetermined value and a null pressure prevails the annular oil chamber 110d. As a result, the line pressure which is supplied from oil path P$_2$ to the down path P$_{11}$ is supplied to oil path P$_{23}$ through the action of the selector valves 130 and 140, shown in FIG. 1, whereby the actuator AC causes the discharge volume of the first hydraulic pump motor M$_1$ to vary to $-V_M$, achieving a null speed ratio. The piston 122 of the accumulator 120 is situated substantially at the center of the body 121.

When the accelerator pedal is depressed at a rate which exceeds the given rate of change for purpose of a rapid starting, the throttle opening increases at a corresponding rate which again exceeds the given rate of change. Accordingly, the plunger 72 of the dash pot 70, the spool 82 of the variable throttle valve 80 and the piston 103 of the speed ratio adjusting valve 100 move to the left. In response to the movement of the plunger 72 and the spool 82 to the left, the hydraulic pressure within the oil chamber 90d of the modulator valve 90 rapidly increases to a value which approximates the differential of the throttle opening, the valve 90 providing an amplification of the hydraulic pressure prevailing in the oil chamber 90d for supply to oil path P$_{27}$. The hydraulic pressure of oil path P$_{27}$ is immediately applied to the annular oil chamber 110d of the oil control valve 110 to move the spool 112 to the left. On the other hand, in response to the movement of the piston 103, to the left, the resilience of spring 104 increases to a value indicative of a target value of the engine speed which corresponds to the throttle opening, whereby the adjusting valve 100 increases the hydraulic pressure supplied to oil path P$_{28}$ as a result of an increase in the difference between the rotational engine speed and the target value thereof. However, the hydraulic pressure in the oil chamber 110a does not rise immediately because of the presence of the orifice O$_5$ and the accumulator 120. Consequently, the spool 112 moves to the left, providing a communication between the speed ratio down path P$_{11}$ and the reservoir Re and a communication between the speed ratio up path P$_{12}$ and oil path P$_2$. Thus, the line pressure from oil path P$_2$ is supplied to the actuator AC through up path P$_{12}$ and oil path P$_{22}$, causing the actuator to vary the discharge volume of the first hydraulic pump motor M$_1$ from $-V_M$ toward $+V_M$, thus causing the speed ratio "e" to begin to increase. As a consequence, an increase in the throttle opening causes the engine speed to increase toward its target value, and when the bypass clutch valve 50 interrupts the communication between oil paths P$_8$ and P$_9$, the running resistance of the vehicle is loaded on the engine E through the transmission H, thus starting the vehicle.

Subsequently the hydraulic pressure in the oil chamber 90d of the modulator valve 90, and hence the hydraulic pressure of oil path P$_{27}$ decreases with time. Because the difference between the engine speed and its target value decreases with time, the speed ratio adjusting valve 100 reduces the hydraulic pressure supplied to oil path P$_{28}$, whereby the hydraulic pressure in the oil chamber 110a of the oil control valve 110 varies toward that value prevailing in oil path P$_{28}$. This causes the spool 112 to move to the right with time, decreasing the degree of communication between down path P$_{11}$ and the reservoir Re and between the up path P$_{12}$ and oil path P$_2$. Consequently, the rate of change of the speed ratio as the latter increases also decrease with time substantially in inverse proportional relationship with respect to the speed ratio. The increase in the speed ratio is momentarily stopped when the spool 112 moves further to the right to interrupt the communication between down path P$_{11}$ and reservoir Re and between up path P$_{12}$ and oil path P$_2$.

It is to be noted that an increase in the speed ratio is suitably determined so that an overloading on the engine E is avoided, and the same applies to another embodiment which will be described later. It will be seen that during a rapid starting, the speed ratio begins to increase at substantially the same time as the engine speed increases toward its target value, with a rate of change of the speed ratio which is substantially in inverse proportional relationship with respect to the speed ratio, so that the difficulty of having an abnormal increase in the engine speed is substantially overcome.

During a normal starting, there occurs no pressure rise in the oil chamber 90d of the modulator valve 90, so that the oil control valve 110 provides a communication between the speed ratio down path $P_{11}$ and oil path $P_2$ until the engine speed reaches its target value since then the hydraulic pressure prevailing in the oil chamber 110a is above the predetermined value, and then provides a communication between the speed ratio up path $P_{16}$ and oil path $P_2$ when the engine speed reaches the target value and the hydraulic pressure of the oil chamber 110a decreases below the predetermined value. In other words, an increase in the speed ratio begins to occur after the engine speed has reached its target value.

The operation after the starting is similar to the conventional arrangement (refer Japanese Patent Application No. 10,127/1976) except that in a range of the speed ratio "e" below "$e_1$*", no line pressure is supplied to oil path $P_{16}$ so that if the throttle opening is increased beyond the given rate of change, the hydraulic pressure supplied to oil path $P_{27}$ causes an increase in the speed ratio as would occur during the rapid starting mentioned above, and that a lag involved in the transmission of the oil pressure from oil path $P_{28}$ to the oil chamber 110a of the oil control valve 110 produces a smooth change in the speed ratio "e" if the throttle opening is rapidly changed, avoiding a rapid change in the engine speed.

An operation during the reverse mode will not be described since it will be readily understood from the above description.

In FIG. 2, the annular oil chamber 100e of the speed ratio adjusting valve 100 may be connected with oil path $P_{27}$ to cause a reduction in the hydraulic pressure supplied to oil path $P_{28}$ whenever the hydraulic pressure occurs in oil path $P_{27}$, thus accelerating an increase in the speed ratio during a rapid starting. In the arrangement of FIG. 2, the plunger 82 of the variable throttle valve 80 is ganged with the throttle opening, but a movement of plunger 82 to the left in accordance with an increase in the throttle opening can also be achieved by driving the plunger 82 to the left with the hydraulic pressure supplied to oil path $P_{28}$ from the speed ratio adjusting valve 100. A fixed orifice may be substituted for the variable throttle valve 80 to derive a hydraulic pressure which approxiates the differential of the throttle opening in oil path $P_{25}$, oil chamber 70a, oil path $P_{26}$ and oil chamber 90d during a rapid starting. Finally, in the arrangement shown, the modulator valve 90 is used to produce a hydraulic pressure in oil path $P_{27}$ which responds to the hydraulic pressure in oil path $P_{26}$. However, the modulator valve 90 can be dispensed with by connecting an accumulator with oil path $P_{26}$ and providing a selector valve which responds to the presence or absence of the line pressure in oil path $P_{26}$ to provide a communication between oil paths $P_{26}$ and $P_{27}$ in the absence of the line pressure in oil path $P_{16}$.

Figure 5:
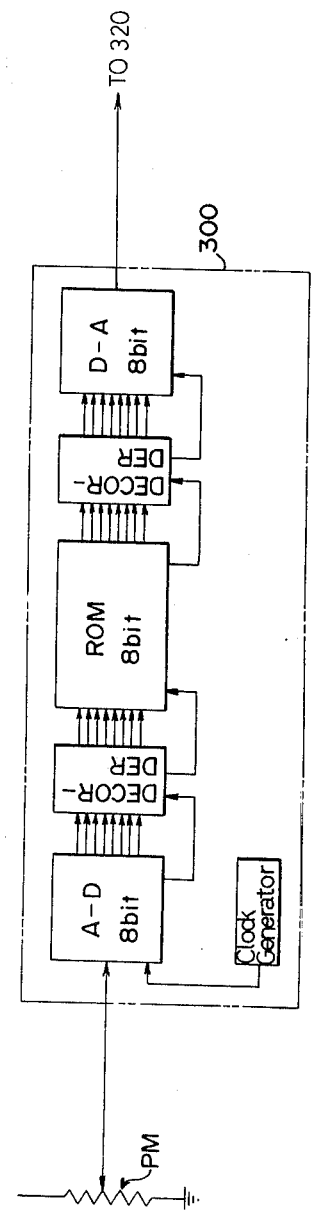
FIG. 5 is a block diagram of a function converstion circuit shown in FIG. 4.
Figure 4:
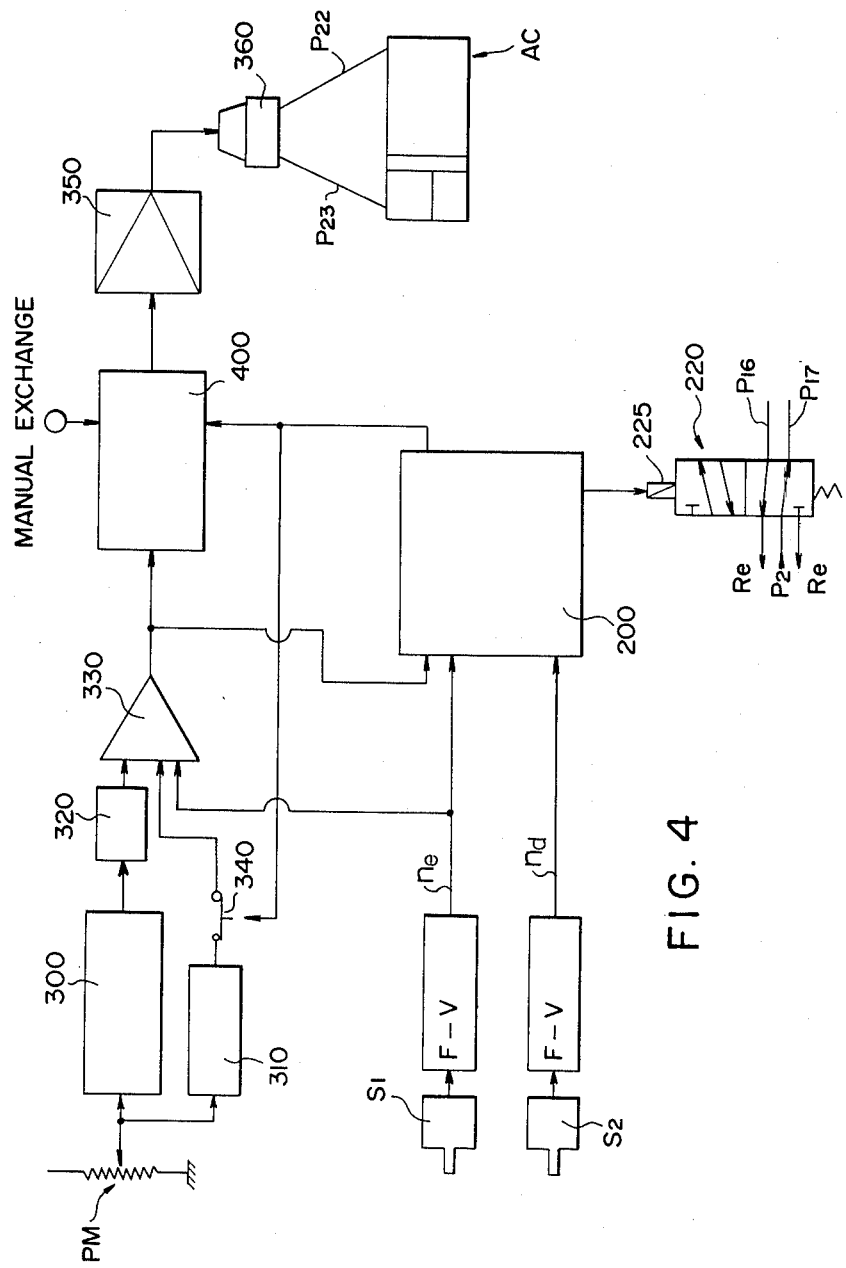
FIG. 4 is a schematic diagram of another embodiment.
Figure 8:
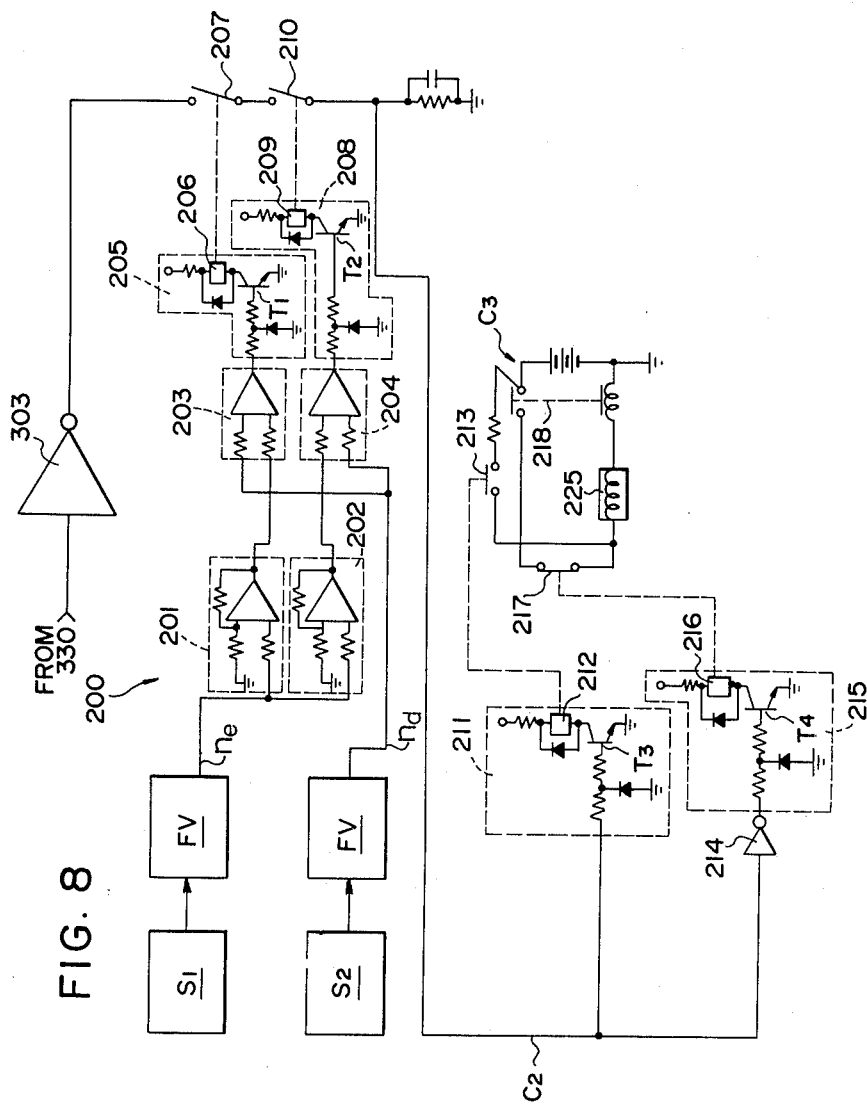
FIG. 8 is a schematic diagram of a clutch control circuit shown in FIG. 4.

An electrical control of the supply of the hydraulic pressure to the actuator AC as well as the low and the high range clutch LC, HC will now be described. Referring to FIG. 4, there is shown a potentiometer PM which is adapted to move with an engine throttle S. The potentiometer PM will provide a positive output potential which varies with the throttle opening. The output of potentiometer PM is fed to a function conversion circuit 300, the detail of which is shown in FIG. 5. Referring to FIG. 5, it compromises an analog-digital converter A-D, a read only memory ROM, and a digital-analog converter D-A. The purpose of the function conversion circuit 300 is to produce a positive potential indicative of a desired value of the engine speed which corresponds to a throttle opening. As shown in FIG. 6, the output of the circuit 300 is fed to a first-order lag circuit or primary delay circuit 320, which comprises resistor 321, capacitor 322 and impedance converting, operational element 323. Thence it is supplied to a positive input of an adder-subtractor 330. The adder-subtractor 330 has a negative input which is fed with a positive potential "$n_e$" responsive to the engine speed and which is formed by the combination of a sensor $S_1$ mounted on the input shaft 2 and sensing the number of revolutions thereof and a frequency-potential converter F-V. When the engine speed coincides with its desired value, the positive potential "$n_e$" also coincides with the positive output potential of the function conversion circuit 300. It is to be understood that the relationship between the throttle opening and the desired value of the engine speed, which has been mentioned previously, also applies in this instance. As shown in FIG. 6, a compensation circuit 310 comprises an impedance converting, operational element 311 having a positive input which is connected with the output of the potentiometer PM; capacitor-resistor differentiator circuit 312 which produces a derivative of the output of the element 311; an impedance converting and amplifying, operational element 313 having a positive input which is connected with the output of the differentiator 312; a transistor 314 which selectively prevents the output of the element 313 from being applied to a normally closed contact 340; and an operational element 315 having a positive input connected with the output of the element 313 and which renders transistor 314 conductive when the output of element 313 is positive. In the compensation circuit 310, the differentiator 312 produces a negative potential when the engine throttle opening increases. As a consequence, the element 313 also produces a negative output as is the output of the element 315, thus rendering transistor 314 nonconductive. As a result, the negative output potential of the element 313 is applied to the normally closed contact 340. By contrast, when the throttle opening is decreased, the differentiator 312 produces a positive output potential as do the elements 313 and 315, thus rendering transistor 314 conductive to bypass the output of the element 313 from the contact 340, which is then maintained at a ground potential. The normally closed contact 340 is opened as a solenoid-operated switch 218 of a clutch control circuit 200, shown in FIG. 8, is operated during the actuation of the high range clutch HC. Consequently, during a starting phase, a negative output potential from the compensation circuit 310 is fed through the normally closed contact 340 to the positive input of the adder-subtractor 330, but when the throttle opening is increased at a rate below a given rate of change, the magnitude of the negative output potential of the compensation circuit 310 will be insufficient to force the output of the adder-subtractor 330 to a negative potential. On the other hand, when the throttle opening is increased at a rate above the given rate of change, the negative output potential of the compensation circuit 310 will force the output of the adder-subtractor 330 to a negative potential. It will be noted that the resistance of differentiator 312 may be changed in accordance with the throttle opening, this corresponding to the use of the variable throttle valve 80 in the arrangement of FIG. 2. If the resistance of differentiator 312 is changed, such change may be initiated not only by the throttle opening, but also by another signal such as the output of the adder-subtractor 330, for example.

The output of the adder-subtractor 330 is fed through a polarity inversion circuit 400 (corresponding to selector valves 130, 140 shown in the embodiment described above) and a servo amplifier 350, in sequence, to a servo valve 360. When the output potential from the circuit 400 is null or when the output potential of the adder-subtractor 330 is null, the servo valve 360 disconnects both oil paths $P_{22}$ and $P_{23}$ of the actuator AC from oil path $P_2$ and reservoir Re. When the output potential from the circuit 400 is positive, it provides a communication between oil paths $P_{23}$ and $P_{22}$ and oil path $P_2$ and reservoir Re, respectively. The degree of communication therebetween is controlled in accordance with the magnitude of the positive potential fed from the circuit 400. If the output from the circuit 400 is negative, oil paths $P_{22}$ and $P_{23}$ communicate with oil path $P_2$ and reservoir Re, respectively, with the degree of communication being controlled in accordance with the magnitude of the negative potential.

Referring to FIG. 7, the polarity inversion circuit 400 is shown as comprising an inverter 401 connected to receive the output of the adder-subtractor 330, a switch 430 which is closed to connect the inverter output to an adder 402 only when the manual shift valve 20 of FIG. 1 is in its reverse position, a normally open contact 404 which is closed to pass the inverter output to an adder 402 in ganged relationship with the solenoid-operated switch 218 of the clutch control circuit 200 only when the high range clutch HC is actuated, and a normally open contact 406 which responds to the energization of a reed relay 405 by closing to pass the output from the adder-subtractor 330 to the adder 402. The reed relay 405 is energized when transistor $T_6$ conducts. It will be seen that transistor $T_6$ is rendered conductive by an AND circuit 408 when both switches 407 and normally closed contact 409 are closed. The switch 407 is closed only when the manual shift valve 20 is in its forward position. The normally closed contact 409 is opened in ganged relationship with the solenoid-operated switch 218 during the actuation of the high range clutch HC. In the circuit 100, when the valve 20 is in its forward position and the low range clutch LC is actuated, the normally open contact 406 is closed while the switch 403 and the contact 404 are open, so that the output from the adder-subtractor 330 is directly applied to the servo amplifier 350. When the valve 20 is in its reverse position and the high range clutch HC is actuated, either switch 403 or contact 404 will be closed while the normally open contact 406 remains open, so that the output from the adder-subtractor 330 is applied to the servo amplifier 350 after its polarity is reversed.

It is to be noted that in an automotive transmission, a high speed ratio is not required during the reverse mode, so that what occurs during such mode is the closure of the switch 403, and no polarity inversion takes place in ganged relationship with the solenoid-operated switch 218. However, it will be readily appreciated from the description given in connection with the forward mode that the inversion of the polarity can take place during the reverse mode by merely adding a polarity inverting circuit which is operated in ganged relationship with the solenoid-operated switch 218 in the similar manner as in the forward mode.

The clutch control circuit 200 controls a solenoid valve 220, which is normally spring biased to a first position in which oil path $P_{17}$ communicates with oil path $P_2$ and oil path $P_{16}$ communicates with reservoir Re. However, when an associated solenoid 225 is energized, the valve 220 assumes another position in which oil path $P_{16}$ communicates with oil path $P_2$ and oil path $P_{17}$ communicates with reservoir Re. The circuit 200 comprise a multiplier 201 which produces a product of the positive potential "$n_e$" (corresponding to the rotation of the input shaft 2) and a speed ratio "$e_2$*"; another multiplier 202 which produces a product of the positive potential "$n_e$" and a speed ratio "$e_1$*"; a comparator 203 which compares a positive output potential $n_e \cdot e_2$* from the multiplier 201 against a positive output potential $n_d$ from a number-of-revolution sensor $S_2$ mounted on the output shaft 10; and another comparator 204 which compares the positive output potential $n_e \cdot e_1$* from the multiplier 202 against the positive output potential "$n_d$" from the sensor $S_2$. When the comparator 203 determines that the product $n_e \cdot e_2$* is greater than "$n_d$", a positive output is applied to transistor $T_1$ in a relay drive circuit 205. When the comparator 204 determines that "$n_d$" is greater than the product $n_e \cdot e_1$*, a positive output is applied to transistor $T_2$ in a relay drive circuit 208. When the positive output is applied to transistor $T_1$, a reed relay 206 is energized to close a normally open contact 207. When the positive output is applied to transistor $T_2$, a reed relay 209 is energized to close a normally open contact 210. If the both transistors $T_1$, $T_2$ are rendered conductive to close the both contacts 207, 210, a circuit $C_2$ is closed which interconnects a driver $C_3$ for the solenoid valve 220 and the adder-subtractor 330. As a consequence, when the adder-subtractor 330 produces a negative potential, it is passed through an inverter 303, whereby a positive potential is applied to circuit $C_2$ to forward bias transistor $T_3$ in a relay drive circuit 211, thus energizing a reed relay 212 to close a normally open contact 213. When the adder-subtractor 330 produces a positive potential, it is inverted by the element 303 to apply a negative potential to the circuit $C_2$. The negative output is passed through an inverter 214 to be applied to forward bias transistor $T_4$ in a relay drive circuit 215. Thereupon a reed relay 216 is energized to open a normally closed contact 217. Stated differently, the clutch control circuit 200 operates in a manner such that when the speed ratio "e" is within a range defined by "$e_1$*" and "$e_2$*", the both normally open contacts 207, 210 are closed, and if the adder-subtractor 330 produces a negative potential, the normally open contact 213 in the drive circuit $C_3$ is closed to energize a solenoid 205 associated with the solenoid valve 220, a self-holding circuit being completed for the solenoid through the solenoid-operated switch 218. If the adder-subtractor 330 produces a positive potential, the normally closed contact 217 in the drive circuit $C_3$ is opened to deenergize the solenoid 225, whereupon the switch 218 is also opened.

In operation, when the engine E is at rest, the solenoid 225 is not energized, and hence the solenoid valve 220 provides a communication between oil paths $P_{17}$ and $P_{16}$ and oil path $P_2$ and reservoir Re, respectively. When the manual shift valve 20 shown in FIG. 1 is brought to its neutral position in order to start the engine E, the hydraulic pump P operates to supply the line pressure to oil path $P_2$ and thence through the solenoid valve 220 to oil path $P_{17}$, whereby the low range clutch LC is actuated. Subsequently when the manual shift valve 20 is shifted to its forward position in order to run the vehicle in the forward direction, the polarity inversion circuit 400 applies the output from the adder-subtractor 330 directly to the servo amplifier 350. Since the positive potential supplied from the function conversion circuit 300 through the primary delay circuit 320 is higher than the positive potential "$h_e$" supplied from the sensor $S_1$, the adder-subtractor 330 now supplies a positive output potential which corresponds to the difference therebetween. Consequently, a positive potential is applied to the servo valve 360 until the accelerator pedal is depressed, whereby the servo valve 360 provides a communication between oil paths $P_{23}$ and $P_{22}$ and oil path $P_2$ and reservoir Re, respectively. As a result, the actuator AC responds to the line pressure supplied from oil path $P_2$ to oil path $P_{23}$ by changing the discharge volume of the first hydraulic pump motor $M_1$ to $-V_M$ and reducing the speed ratio "e" to null.

When the accelerator pedal is depressed at a rate exceeding the given rate of change, an increase in the throttle opening causes a positive output potential from the potentiometer PM to reduce to a value which depends on the magnitude of such opening. In response thereto, the function conversion circuit 300 produces an increased positive output, and also the compensation circuit 310 produces a negative potential which corresponds to the derivative of the throttle opening. This negative output is passed through the normally closed contact 340 to the positive input of the adder-subtractor 330 while the output from the circuit 300 is not immediately applied thereto as a result of the functioning of the primary delay circuit 320. The adder-subtractor 330 produces an output which represents the positive potential "$n_e$" subtracted from the sum of the positive potential supplied through the primary delay circuit 320 and the negative output from the compensation circuit 310, this output of the element 330 being negative. In response thereto, the servo valve 360 provides a communication between oil paths $P_{22}$ and $P_2$ and between oil path $P_{23}$ and reservoir Re, whereby the actuator AC causes the discharge volume of the first hydraulic pump motor $M_1$ to initiate its change toward $+V_M$, thus beginning to increase the speed ratio "e". Consequently, the engine speed increases toward its target value as the throttle opening increases, and when the bypass clutch valve 50 shown in FIG. 1 interrupts the connection between oil paths $P_8$ and $P_9$, the running resistance of the vehicle is loaded on the engine E to start the vehicle.

Subsequently the negative output from the compensation circuit 310 decreases with time while the output from the primary delay circuit 320 approaches its input with time, and the positive potential "$n_e$" increases with time. The net result is a reduction of the negative output from the adder-subtractor 330 with time, and correspondingly the servo valve 360 decreases the degree of communication between oil paths $P_{22}$ and $P_2$ and between oil path $P_{23}$ and reservoir Re. Consequently, the rate of change of the speed ratio decreases with time substantially in inverse proportional relationship with respect to the speed ratio. This results in a substantial elimination of an abnormal rise in the engine speed during a rapid starting.

The operation which occurs after the starting as well as the operation during the reverse mode will be apparent from the foregoing description, and therefore will not be described separately.

The primary delay circuit 320 can be dispensed with if the compensation circuit 310 is constructed to produce a greater magnitude of negative output potential. However, the provision of such delay circuit is advantageous in achieving a rapid change from a positive to a negative output potential from the adder-subtractor 330 during a rapid starting.

In the embodiment described above, the engine speed corresponding to a throttle opening has been chosen as a controlled variable, but the invention is equally applicable if an engine output torque corresponding to a throttle opening, an engine speed corresponding to an engine output torque or an engine output torque corresponding to the number of rotations of an engine is chosen as a controlled variable.

It should also be understood that while the hydromechanical transmission has been utilized as a stepless transmission in the embodiments described above, any other from of stepless transmission may be used.

It will be appreciated from the foregoing that the invention provides means which produces a signal indicative of the derivative or pseudo-derivative of a throttle opening, and comparison means which compares an output from this means against a desired value signal generator during the starting of a vehicle so as to achieve a temporary increase in the speed ratio, thereby substantially eliminating an abnormal rise in the engine speed during a rapid starting.

What is claimed is:

1. In an automatic speed ratio control system for a stepless transmission of an automotive vehicle, having a desired value signal generator means which produces a desired engine speed signal which corresponds to a throttle opening for controlling operation of an engine on the automotive vehicle, a detector means for producing a signal indicative of operation of the engine, a control signal generator means for comparing the signal from the detector means against the desired value signal from the desired value signal generator means to generate a deviation signal in accordance with a deviation therebetween and a controller means responsive to the deviation signal from the control signal generator means to change a speed ratio of the stepless transmission, said means comprising an integration servo control system further including means for producing a differential signal indicative of a differential or pseudo-differential of a throttle opening during the time the throttle opening increases, the differential signal being added in opposing relationship with the desired value signal from the desired value signal generator means or the deviation signal from the control signal generator means.

2. In an automatic speed ratio control system for a stepless transmission of an automotive vehicle as set forth in claim 1 in which the desired value signal generator means includes a speed ratio adjusting valve having a piston projecting out of the valve body for abutment against a cam which assumes an angular position corresponding to the throttle opening; the control signal generator means includes a speed ratio adjusting oil control valve; the means for producing the differential signal includes hydraulic valves, at least one of which has a plunger projecting out of the valve body for abutment against a cam which rotates in synchronism with opening of the throttle valve in the engine; and the differential signal is an oil pressure being supplied to the speed ratio adjusting oil control valve from one of the hydraulic valves.

3. In an automatic speed ratio control system for a stepless transmission of an automotive vehicle as set forth in claim 1 in which the desired value signal generator means includes a potentiometer which is adapted to move with the throttle valve in the engine, a function conversion circuit and a first-order lag circuit; the detector means includes a speed sensor which generates a train of pulses, the frequency of which corresponds to rotational speed of the engine, and a frequency-potential converter; the control signal generator means includes an adder-subtractor circuit; the controller means includes a servo amplifier and a servo valve having a control solenoid; and the means for producing differential signal is a compensation circuit including a differential circuit connected with the output of the potentiometer and a switching means selectively supplying output of the differential circuit to the adder-subtractor circuit in negative sense against the output of the first-order lag circuit.

* * * * *